March 29, 1960  J. E. LOVRET  2,930,264
REAMERS
Filed July 11, 1958

John E. Lovret
INVENTOR.
BY

United States Patent Office 2,930,264
Patented Mar. 29, 1960

2,930,264

REAMERS

John E. Lovret, Rosedale, N.Y., assignor to Microtron Inc., Port Washington, N.Y., a corporation of New York Application July 11, 1958, Serial No. 747,897

8 Claims. (Cl. 77—72)

This invention relates to reamers; and it comprises a rod of circular cross section with two surfaces at an oblique angle to each other so as to define on said rod a relatively short cutting portion and a relatively long bearing portion, all as more fully described hereinafter and as claimed.

Reamers of conventional fluted construction, particularly those of small size, for holes having a diameter of one-eighth inch and less, have left much to be desired. They have been relatively expensive on the one hand, and, on the other hand are quite difficult for the user to hand hone to a smaller size since each of the several flutes must be honed to exactly the same extent, a tedious, exacting and costly operation.

It is an object of this invention to provide a reamer relatively simple and inexpensive in manufacture;

Another object is to provide a reamer, especially adapted for reaming holes of relatively small size, which is characterized by a structurally strong shape and, therefore, a long life;

A further object is to provide a reamer which can easily be reduced in diameter by the user, if so desired.

Other objects will become apparent from the following description and from the appended drawings in which.

Figure 1:
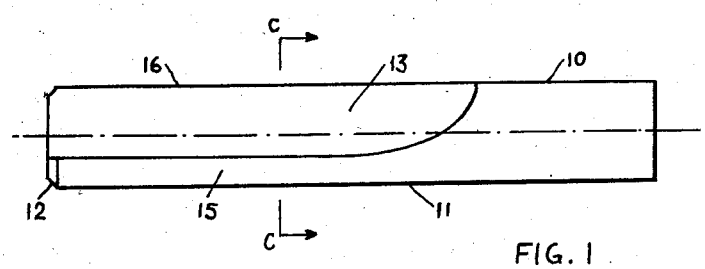
Fig. 1 is a side view of a reamer according to my invention.

Referring now to Fig. 1, the reamer has a shank part 10 adapted for chucking and a working part 11, the end of which is chamfered, as shown at 12. On the working part 11, of basically cylindrical shape, are ground two surfaces 13 and 14 at an oblique angle to each other so as to leave a relatively wide bearing portion 15, preferably extending through an angle of 90° to 180°, and a relatively narrow cutting portion 16, extending through an angle of 20° or less.

Figure 3:
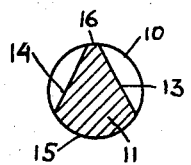
Figs. 3, 4, 5 and 6 are alternative cross sectional views, taken along the lines C—C, through reamers shown in Figs. 1 and 2.
Figure 4:
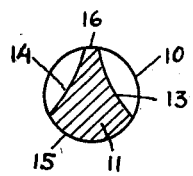
Figure 5:
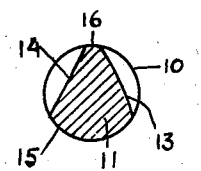

The surfaces 14 and 13 may be flat, as shown in Fig. 3, or concave as shown in Fig. 4, or convex, as shown in Fig. 5 on surface 13, the radius of curvature of such concave or convex surfaces being relatively large, at least three times the radius of the reamer itself. I have found reamers with flat surfaces 14 and 13, as shown in Fig. 3, wholly satisfactory. Concave surfaces 14 and 13 (Fig. 4) also result in satisfactory reamers, although of slightly less strength because of the reduced material in the working part 11, and they are somewhat more convenient in manufacture because such concave surfaces may be formed by grinding on the periphery of a grinding wheel. Convex surfaces (Fig. 5) on the other hand, while somewhat more difficult to form, may be desirable where a reamer of exceptional structural strength is wanted, because the working part 11 then has more material in it than with either flat or concave surfaces.

The reamer of Fig. 1 is suitable for reaming either bottomed holes or through holes.

Figure 2:
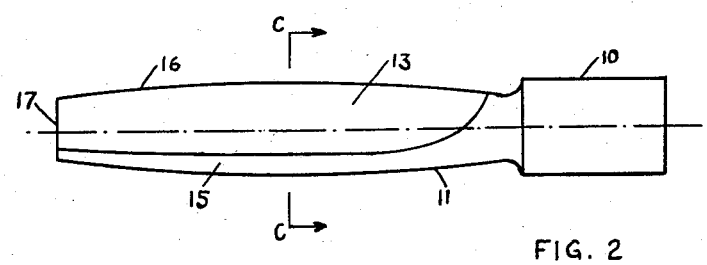
Fig. 2 is a side view of a modified reamer in accordance with my invention.

The modification shown in Fig. 2 is especially adapted for through holes. It differs from the form shown in Fig. 1 in that the working part 11 is barrel shaped, as shown, rather than cylindrical as in Fig. 1. A reamer as shown in Fig. 2 enters the hole to be reamed with great ease because of the reduced diameter at the end 17, and it is subjected to relatively low stresses during reaming because the cutting takes place on a narrow portion of the barrel shaped working part 11, i.e. at the region of maximum diameter in the vicinity of the lines C—C. Thus, reamers of this shape are characterized by a particularly long life.

The bearing portion 15 should be relatively long peripherally to provide a low bearing pressure and give adequate strength to the working part 11. A length of between 90° and 180° is satisfactory. However, it should not substantially exceed 180° in length because it then would tend to center the reamer in the hole and thus interfere with the cutting action.

The cutting portion 16 on the other hand should be relatively short, less than 20°, to provide effective performance. On a reamer one-sixteenth inch in diameter 20° corresponds to less than 0.01 inch in peripheral length.

Reamers in accordance with my invention should, of course, be made from a suitably hard material, as is customary in all reamers; I consider carbide particularly suitable. If such reamers become dull in prolonged use, the cutting edge may readily be restored, without affecting the diameter, by merely slightly grinding or honing either or both of the surfaces 13 and 14.

Figure 6:
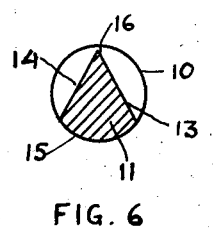

A reamer in accordance with my invention, however, may also readily be modified so as to ream undersize holes by carefully grinding, stoning or honing one or both of the surfaces 13 and 14 until the cutting portion 16 has been reduced to a knife edge located a short distance inside the periphery, as illustrated in Fig. 6. Alternatively, a high degree of size control can also be obtained by grinding, stoning or honing cutting portion 16, or bearing portion 15, or both. Since the bearing portion 15 is relatively broad a large number of honing strokes will reduce the cutting size of the reamer by only a small increment, thus making it easy to achieve changes in size measuring but a few millionths of an inch.

Either of the foregoing methods of reducing the size of my reamer or re-sharpening it is much simpler and quicker and, therefore, less costly than the honing of conventional fluted reamers.

While I have shown and described what I believe to be the best embodiments of my invention, modifications may be made without departing from its spirit, and reference is, therefore, made to the following claims for a definition of the scope of my invention.

What I claim is:

1. A reamer consisting of a rod having a shank part adapted for chucking and a working part of basically round cross section, two surfaces ground on said working part at an oblique angle to each other, said working part having a peripherally relatively long bearing portion and a peripherally relatively short cutting portion, said bearing and cutting portions each extending from one of said surfaces to the other, and each of said two surfaces extending from said bearing portion to said cutting portion.

2. A reamer according to claim 1, said working part being of cylindrical shape.

3. A reamer according to claim 1, said working part being of barrel shape.

4. A reamer according to claim 1, said bearing portion being peripherally between 90° and 180° long.

5. A reamer according to claim 1, said cutting portion being peripherally less than 20° long.

6. A reamer according to claim 1, at least one of said surfaces being flat.

7. A reamer according to claim 1, at least one of said surfaces being concave.

8. A reamer according to claim 1, at least one of said surfaces being convex.

References Cited in the file of this patent

UNITED STATES PATENTS

| | | |
|---|---|---|
| 385,088 | Benzie | June 26, 1888 |
| 1,323,278 | Hoagland | Dec. 2, 1919 |
| 2,475,514 | Plumley | July 5, 1949 |